United States Patent [19]
Stone

[11] 3,729,617
[45] Apr. 24, 1973

[54] FEE COMPUTING SYSTEMS

[75] Inventor: Roger Geoffrey Stone, Hayes, England

[73] Assignee: APT Controls Limited, London, England

[22] Filed: June 29, 1971

[21] Appl. No.: 157,982

[30] Foreign Application Priority Data

June 29, 1970 Great Britain.....................31,295/70

[52] U.S. Cl. ...235/61.7 R, 194/DIG. 23, 235/61.8 A, 235/92 TC
[51] Int. Cl. ..........................................G06k 17/00
[58] Field of Search.....................235/92 T, 92 TA, 235/61.8 A, 61.7 R; 340/51, 48; 194/DIG. 23, DIG. 22

[56] References Cited

UNITED STATES PATENTS

| 2,712,125 | 6/1955 | Koch | 340/51 |
| 3,548,161 | 12/1970 | Schwartz | 235/61.8 A |
| 3,641,314 | 2/1972 | Abramson | 235/61.8 A |
| 3,604,898 | 9/1971 | Magnasson | 235/61.8 A |
| 3,252,134 | 5/1966 | Auer | 235/92 T |
| 3,097,295 | 7/1963 | Williams | 235/92 EV |

Primary Examiner—Daryl W. Cook
Assistant Examiner—Joseph M. Thesz, Jr.
Attorney—Beveridge & DeGrandi

[57] ABSTRACT

A parking fee computing system in which pulses representing units of real time are counted and the instantaneous count thereof is compared with a stored count read from a ticket. The stored count is changed by pulses from a coin operated device until there is parity between the stored count and the instantaneous count. The frequency of the first pulses are varied according to a preset program.

4 Claims, 1 Drawing Figure

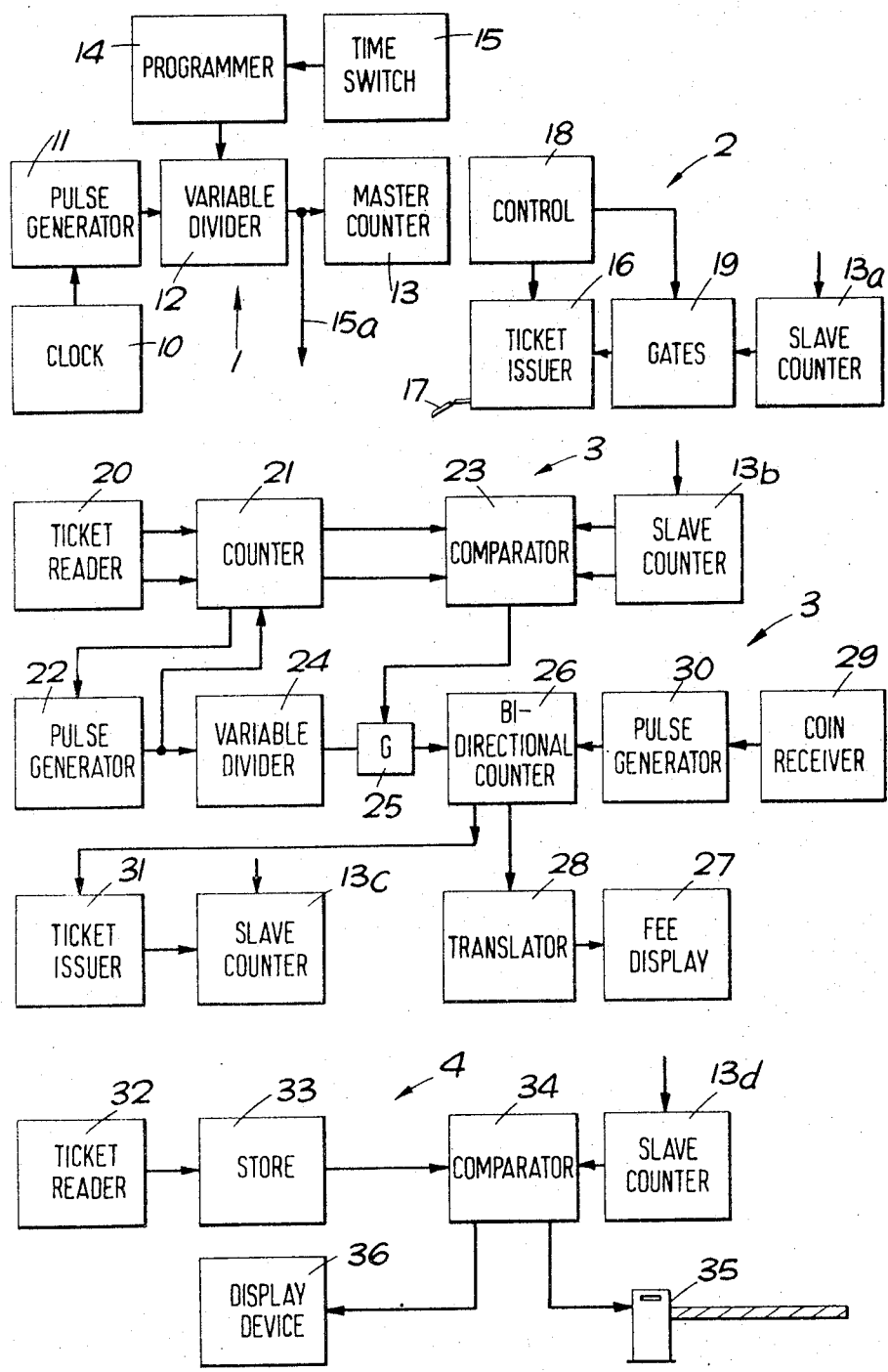

FEE COMPUTING SYSTEMS

This invention relates to fee computing systems and more particularly although not exclusively to fee computing systems for car parks.

There has been proposed, for example in the Specification of British Pat. No. 1013641, a number of systems for automatically computing a fee depending on a duration such as the length of a visit to a car park or elsewhere. In general the systems comprise means for issuing a ticket carrying an indication of a first time, such as a time of entry into a car park, a ticket reader which reads the indication and a system which compares the time read from the ticket with the time of reading so as to derive a basis for computing a fee which is normally proportional to the interval between the two times.

One general disadvantage of known systems is that it, is difficult to make provisions for automatically varying the rate of charge during predetermined periods. For example it may be desirable to discourage parking at certain times of the day and to do this by increasing the charge per unit time of stay during peak hours. The charge for a visit including or starting within such times would be different from charges for a visit of the same duration but not including the whole or part of such times. The present invention is concerned with a system in which a temporary or periodic change in the rate of charge can readily be provided.

According to the invention a fee computing system comprises means for providing a succession of electrical signals, means for counting the said signals, a ticket issuer arranged to issue a ticket carrying an indication of the count at the time of issue of the ticket, means for reading the indication on the ticket, means for storing the indication read from the ticket, means for feeding pulses corresponding to units of currency to change the stored indication, a comparator for detecting parity between the stored indication and the instantaneous count provided by the means for counting, means under the control of the comparator for indicating the fee payable in accord with the number of pulses necessary to produce parity between the count represented by the indication on the ticket and the instantaneous count and a programmer under the control of a time switch for changing the frequency of the said signals according to a predetermined programme.

With the present invention, the interval between the issue and reading of a ticket is computed not in terms of real time but in terms of a count of electrical signals whose frequency can be changed. The advantage of this arrangement is that the time between successive signals can represent a variable unit of time or, in effect, a variable charge per unit time. Accordingly if the fee payable is computed as proportional to the difference between the count at the times of issue and reading of the ticket periods of greater or lesser charge per unit time can readily be automatically provided by changing the frequency of the electrical signals for the period or periods for which the greater or lesser charge per unit time is to be provided.

The programmer would conveniently be under the control of a time switch or similar device. Thus for example if the unit of time corresponding to a unit of charge is for certain times of the day to be increased by a factor of two it is only necessary to change, for an appropriate period, the frequency of the electrical signals to twice the normal frequency. This can easily be done by feeding the said signals through a controllable frequency divider to the means for counting and altering as required the divisor provided by the divider.

There may be provided means for feeding into a bidirectional counter a number of pulses corresponding to or proportional to the difference between the count represented by the indication and the said instantaneous count. With this arrangement the contents of the bidirectional counter may be displayed in the form of a fee payable and a coin operated means may be provided for reducing the contents of the bidirectional counter in accord with units of currency represented by inserted coins. Thus when the indication of the contents of the counter becomes zero the required fee will have been paid.

Means may be provided for varying a ratio between the pulses fed to the counter for a given difference between the count represented by the said indication and the instantaneous count. By this means the charge levied per unit time, which unit is varied according to the frequency of the signals which are counted as described above, can be varied overall.

A further development of the present system is particularly useful in the case of car parks from which premature exit without full payment is to be prevented. For this purpose means responsive when a required fee has been paid may be arranged to issue a further ticket, possibly with an indication of time thereon and at least one gate associated with a further ticket reader may be provided. Then the second ticket must be inserted in the ticket reader for the exit gate to be opened. It is readily possible to arrange for the second ticket to have an indication of its issue time marked thereon and for the second ticket reader to operate the gate only if the second ticket is presented within a predetermined time. An additional fee may be automatically levied if the second ticket is presented after the expiry of the predetermined time from the issue of the second ticket but within a period of grace.

Reference hereinafter will be made to the accompanying drawing which illustrates schematically one embodiment of the invention.

Referring now to the drawing there is provide a reference clock 10 which conveniently takes as a reference signal the mains frequency. The clock 10 governs a means for providing pulses, this means being illustrated as a pulse generator 11. It will be understood that this pulse generator and other pulse generators in the system to be described can take the form of a variable divider which receives relatively high frequency pulses from the clock and provides output pulses at a rate appropriate to the particular part of the system. However for convenience this and similar means in the specification will be referred to as a pulse generator. Pulses from the pulse generator are fed through a variable divider 12 to a master counter 13. This conveniently comprises a multibit binary counter. Normally this counter will make a count at a regular rate and accordingly its count at any time will depend on a time which has elapsed from the start of the count. The count at any time is however not proportional to the elapsed time because at selected instants the variable divider 12 adjusted by means of a programmer 14 which is under the control of a time switch 15. For example, the time switch may be arranged at the beginnings and ends of predetermined periods such as peak parking periods to provide timing signals from the programmer which alters the division ratio during those periods so as to increase or decrease the rate of pulses which are actually fed to the master counter 13. The pulses fed to the master counter 13 essentially define fixed units of charge or variable units of time.

The variable divider is adapted to provide on an output 15a signals controlling slave counters 13a, 13b etc. to indicate the same count as does the master counter. The purpose of these several slave counters will be described hereinafter. A ticket issuing system is denoted generallyby the reference numeral 2. This comprises a ticket issuer 16 which is controlled to issue a ticket 17 when a control 18 is operated. The control 18 may be operated by the entry of a vehicle into a car park and it would be convenient for the operation to be rendered automatic following any one of the known techniques for causing the automatic issue of tickets when a car enters a car park. The control 18 also opens gates 19 which feed signals representing the instantaneous contents of the slave counter 13a, which contents are the same as the contents of the master counter 13, to the ticket issuer 16 which in accord with known techniques provides on the ticket 17 an indication of the contents of the slave counter. This indication is in accord with the time of issue of the ticket but as explained herein is in terms of the artificial time defined by the contents of the master counter.

The ticket issued by the ticket issuer would be retained until the issuee decides to remove his car from the car park. At that time the ticket 17 must be presented to a ticket reader 20 for the calculation of the charge payable by a fee computing circuit 3. When the ticket 17 is presented to the ticket reader 18, the ticket reader reads the indication on the ticket and feeds signals representative thereof to a counter 21. At the same time a pulse generator 22, which may be a trigger circuit synchronized with the mains supply, is arranged to feed pulses at a relatively rapid rate into the counter 21 in order to make the contents of the counter 21 equal to the contents of the slave counter 13b. The contents of the slave counter 13b will represent the time of reading of the ticket. While pulses are fed from the pulse generator 22 to the counter 21, they are also fed through a variable divider 24 through a gate 25, under the control of the comparator 23, to a bidirectional counter 26.

When the comparator 23 detects coincidence between the contents of the counter 21 and the contents of the slave counter 13b the gate 25 is closed so that the contents of the bidirectional counter 26 represent the difference between the contents of the master counter at the time of issue of the ticket and the contents of the master counter at the time of reading the ticket in terms of a fee payable. The ratio between the number of pulses actually fed to the bidirectional counter 26 and the number of pulses fed to the counter 21 in order to make its contents equal to the contents of the slave counter 13b is controlled by the variable divider 24. By adjusting the divisor provided by the variable divider 24 the cost of parking per unit of real time can be adjusted, the adjustment being effected pro rata for all the possible multiples of the basic fee that can be provided by adjusting the divider 12. The contents of the bidirectional counter are displayed on a fee display 27 which is coupled through a translator 28 to the bidirectional counter 26.

The user of the car park will insert coins into a coin receiver 29 which actuates a pulse generator 30 to feed into the bidirectional counter 26 count-down pulses proportional to the value of monetary units received by the coin receiver 29. When the total monetary value of coins received by the receiver 29 has caused the bidirectional counter 26 to have been counted down to zero the fee displayed by the display 27 will likewise be zero.

The remainder of the system is concerned with providing additional means for rendering the car park virtually automatic while preventing removal of cars without payment. When the fee payable has been paid a second ticket is issued by a ticket issuer 31, the time of issue being indicated thereon in accord with the contents of a further slave counter 13c at the time when the counter 26 attains a zero count. The counter 26, which includes a parity check, is coupled to the ticket issuer 31 to control thereby the issue of the 'second' ticket. The second ticket must be presented to a second ticket reader 32 which reads the indication on the second ticket and feeds signals representing the issue time of the second ticket to a store 33. A comparator 34 compares the time indicated by the contents of the store with the contents of another slave counter 13d and if the times represented by the contents of the store 33 and the counter 13d are within 15 minutes of each other the comparator 34 provides a signal for opening an exit barrier 35 to release the motorist from the car park. If the motorist should have over stayed the 15 minutes of grace given from the issue of the second ticket by the ticket issuer 31 then the comparator 34 actuates a display device 36 which indicates that a small excess fee is payable. The barrier 35 is preferably adapted so as to be openable on payment of this additional fee. If however the motorist should have over stayed by more than thirty minutes he must return to one of the reader stations with a ticket reader 20 in order to obtain a recomputation of his fee. A further refinement to the system may be provided in order to ensure that should a queue form at an exit gate the fifteen minute period of grace will be automatically extended so as not to penalize a motorist who should have left without penalty.

The term 'ticket' is intended to refer to tokens and other devices as well as ordinary punched or printed paper tickets.

I claim:

1. A fee computing system comprising means for providing a succession of electrical signals, a first counter for counting the said signals, a ticket issuer coupled to said first counter and arranged to issue a ticket carrying an indication of the count at the time of issue of the ticket, ticket reader means for reading the indication on the ticket, first store means coupled to said ticket reader means for storing the indication read from said ticket by the ticket reader, means for feeding first pulses corresponding to units of currency to said first store means to change the stored indication therein, a comparator for detecting parity between the stored indication and the instantaneous count provided by the said first counter, a bidirectional counter, means for feeding to said bidirectional counter second pulses in proportion to said first pulses to cause an up-count of said bidirectional counter, means coupled to said bidirectional counter for indicating a fee payable, said comparator being coupled to inhibit said means for feeding on the detection of said parity, a currency receiver coupled to said bidirectional counter for producing a down-count therein in accord with money received by said receiver, and a programmer including a time switch for changing the frequency of said signals according to a predetermined program.

2. A system according to claim 1 wherein said means for feeding includes variable divider means for changing a ratio between the said first pulses and said second pulses.

3. A system according to claim 1 in combination with a second ticket issuer and means, for causing said second ticket issuer to issue a ticket carrying an indication of the count of said first counter at the time of issue of a ticket.

4. A system according to claim 3 further comprising a second ticket reader, means for comparing an indication read by said second ticket reader with the instant count, of said first counter and barrier means, said means for comparing providing a barrier-opening signal on detection of disparity, less than a predetermined limit, between the latter count and the indication read by said second ticket reader.

* * * * *